US012586103B2

(12) United States Patent
Landahl et al.

(10) Patent No.: US 12,586,103 B2
(45) Date of Patent: Mar. 24, 2026

(54) METHOD AND APPARATUS FOR DISPLAYING ADVERTISEMENTS

(71) Applicant: Digital Table Advertising, LLC., Depew, NY (US)

(72) Inventors: Steven A. Landahl, Depew, NY (US); Jason Wollin, Cheektowaga, NY (US); Kolby Reumann, Buffalo, NY (US); Robert Klingensmith, III, Williamsville, NY (US)

(73) Assignee: Digital Table Advertising, LLC., Depew, NY (US)

( * ) Notice: Subject to any disclaimer, the term of this patent is extended or adjusted under 35 U.S.C. 154(b) by 282 days.

(21) Appl. No.: 18/112,957

(22) Filed: Feb. 22, 2023

(65) Prior Publication Data

US 2023/0267509 A1    Aug. 24, 2023

Related U.S. Application Data

(60) Provisional application No. 63/312,762, filed on Feb. 22, 2022.

(51) Int. Cl.
*G06Q 30/02* (2023.01)
*G06Q 20/38* (2012.01)
*G06Q 30/0272* (2023.01)

(52) U.S. Cl.
CPC ....... *G06Q 30/0272* (2013.01); *G06Q 20/389* (2013.01)

(58) Field of Classification Search
CPC ............. G06Q 30/0207–30/0277; G06F 40/40
See application file for complete search history.

(56) References Cited

U.S. PATENT DOCUMENTS

| | | | |
|---|---|---|---|
| 11,636,520 B1 * | 4/2023 | Olden | G06Q 30/0277 |
| | | | 705/14.69 |
| 2012/0314353 A1 * | 12/2012 | Williams | G09F 7/18 |
| | | | 361/679.01 |
| 2013/0041730 A1 * | 2/2013 | LoBianco | G09F 13/00 |
| | | | 40/538 |
| 2016/0270561 A1 * | 9/2016 | Williams | A47G 23/0225 |
| 2017/0011431 A1 * | 1/2017 | Thamert | H04N 21/812 |
| 2020/0084483 A1 * | 3/2020 | Brown | G06Q 20/405 |
| 2020/0387930 A1 * | 12/2020 | Canceri | G06F 1/1607 |
| 2023/0081152 A1 * | 3/2023 | Blazevige | G06Q 20/20 |
| | | | 705/42 |

(Continued)

FOREIGN PATENT DOCUMENTS

| | | | |
|---|---|---|---|
| CN | 219069886 U | * | 7/2020 |
| WO | WO 2023/081623 A1 | * | 11/2021 |

*Primary Examiner* — Thuy N Nguyen
(74) *Attorney, Agent, or Firm* — Law Office of Vincent LoTempio, PLLC; Vincent G. LoTempio; Robert L. Cerasa

(57) ABSTRACT

The holding apparatus having an embedded display device that is configured to display a plurality of advertisements in a secure manner for a pre-defined time interval. The holding apparatus comprises a bottom/middle section configured to hold one or more objects, and a plurality of holder sides disposed at each lower end of the bottom/middle section. The holding space is utilized for keeping objects, such as napkins, menu card. Further, a puck connected to a virtual mesh Wi-Fi network 114 connects to a private block chain and the display device to securely display advertisements on the display device of the holding apparatus.

7 Claims, 6 Drawing Sheets

(56) References Cited

U.S. PATENT DOCUMENTS

2023/0115714 A1* 4/2023 Sagoo .................. H02J 7/0042
345/173
2023/0186350 A1* 6/2023 Nahounou ......... G06Q 30/0273
705/14.68

* cited by examiner

100

400

Start — 402

Connect puck to public network — 404

Connect to controller from private blockchain network — 406

Get UTC (Date and Time) — 408

Pull Ad Units — 410

Pull Ad Media — 412

Transmit notification to display device indicative of network ready — 414

Respond to plurality of display requests received from display device — 416

Disconnect from controller — 418

End — 420

METHOD AND APPARATUS FOR DISPLAYING ADVERTISEMENTS

CROSS-REFERENCE TO RELATED APPLICATIONS AND PRIORITY

The present application claims priority from U.S. Provisional Application No. 63/312,762, filed on Feb. 22, 2022 and entitled METHOD AND APPARATUS FOR DISPLAYING ADVERTISEMENTS.

TECHNICAL FIELD

This disclosure relates generally to a holding apparatus, and more particularly to a method for securely displaying advertisements on a display device of the holding apparatus.

BACKGROUND

Currently, at public places advertisements are shown on billboards and such billboards need not necessarily be placed within the eyesight of the consumers. Hence the purpose of advertisement is defeated. Specifically, in restaurants the advertisements boards show static advertisements. Further, an advertiser would have paid the restaurant to display specific advertisement at a particular time. However, the advertiser has no control or does not have any knowledge whether the advertisements were actually displayed at the particular requested timing.

Additionally, the advertisements displayed on the display screen are merely stored in some storage media and there is no security associated with the same. Thus, there is a need to securely display advertisements in public places which are accessible to consumers. Additionally, an apparatus which integrates such a display device but at the same time being used for another purpose for consumers at public places such as a restaurant is desirable.

SUMMARY

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
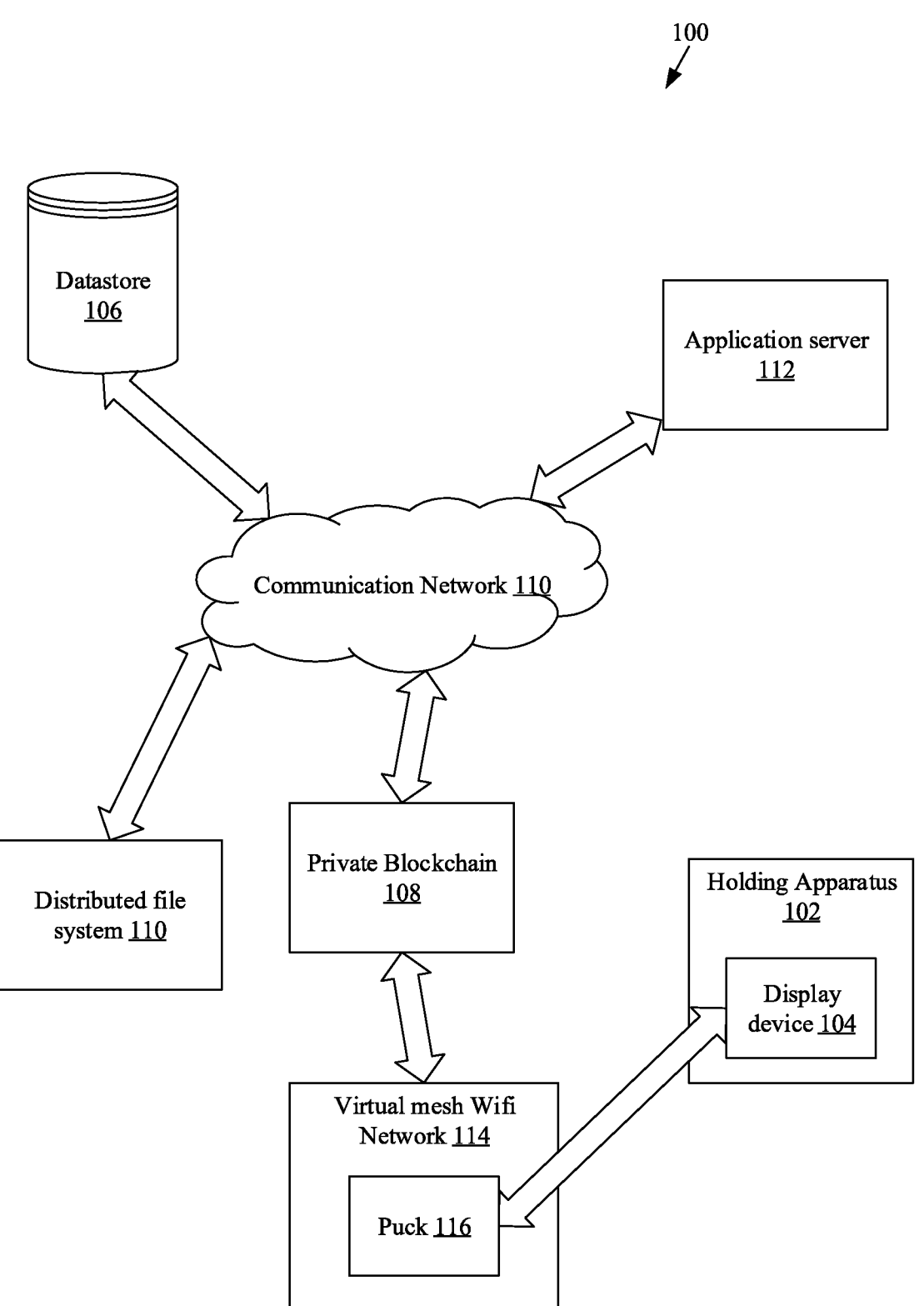
FIG. 1 is a block diagram of a system environment for securely displaying advertisements on a display device embedded within a holding apparatus, in accordance with some embodiments of the present disclosure.

Various implementations may be found in a method and/or a holding apparatus for securely displaying advertisements on the display device embedded within the holding apparatus FIG. 1 is a block diagram of a system environment for securely displaying advertisements on a display device 104 embedded within a holding apparatus 102, in accordance with an embodiment of the present disclosure. The system environment 100 comprises a holding apparatus 102 within which a display device 104 is integrated. The communication network 110 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN). The system environment 100 further comprises a data store 106, a private block chain 108, a distributed file system 110, an application server 112, a virtual mesh Wi-Fi network 114 and a puck 116 connected to the virtual mesh Wi-Fi network 114.

Figure 2A:
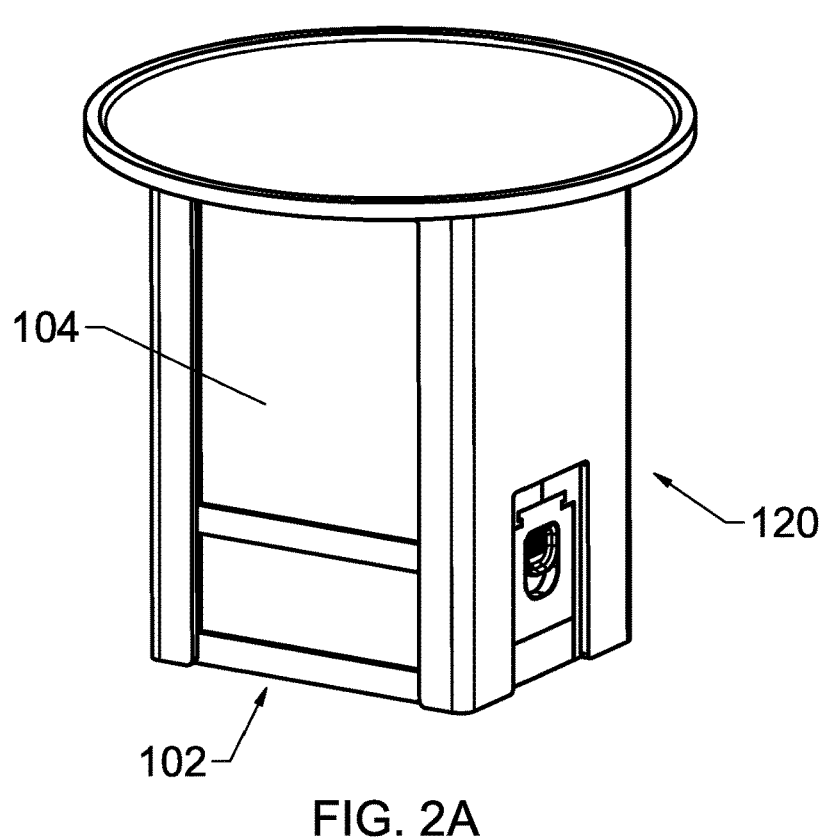
FIG. 2A is a perspective view of the holding apparatus with a slide-over table top attachment, in accordance with an embodiment of the present disclosure.

FIG. 2A is a perspective view of the holding apparatus with a slide-over table top attachment 120, that shows that holding space for the one or more objects, such as napkins and the embedded display device 104 in accordance with an embodiment of the present disclosure. The holding apparatus 102 further has an embedded display device 104 that may be configured to display a plurality of advertisements for a pre-defined time interval. FIG. 2C is a perspective view of a slide-over table top attachment 120, in accordance with some embodiments of the present disclosure. The slide-over holder table top attachment provides additional holding space for objects, such as menus, plates, pizza trays and the like, in accordance with an embodiment of the present disclosure.

Figure 2B:
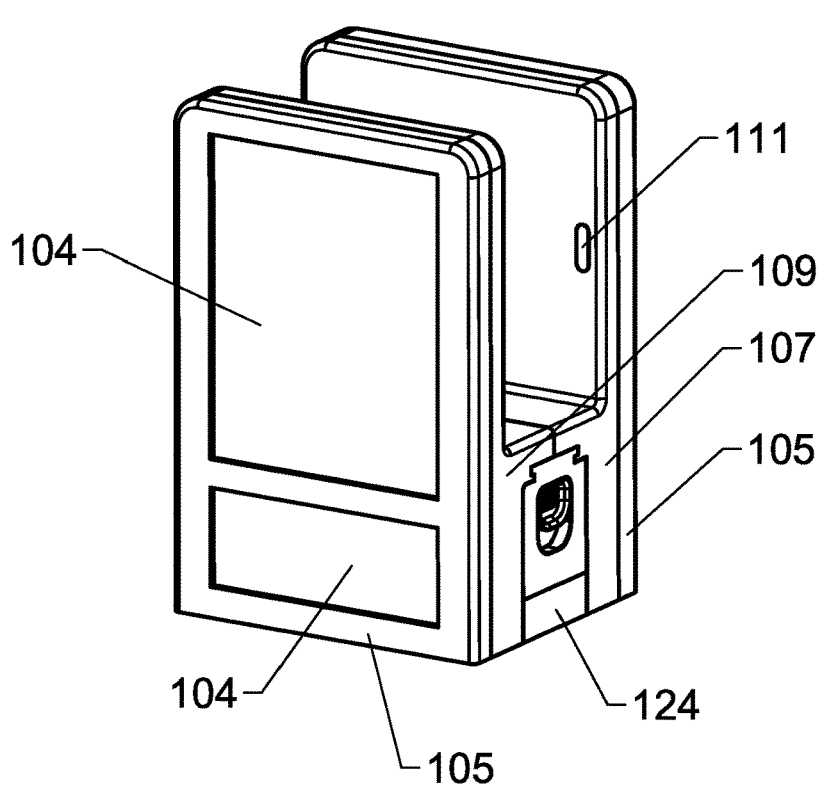
FIG. 2B is a perspective view of the holding apparatus, in accordance with some embodiments of the present disclosure.
Figures 2C, 2D:
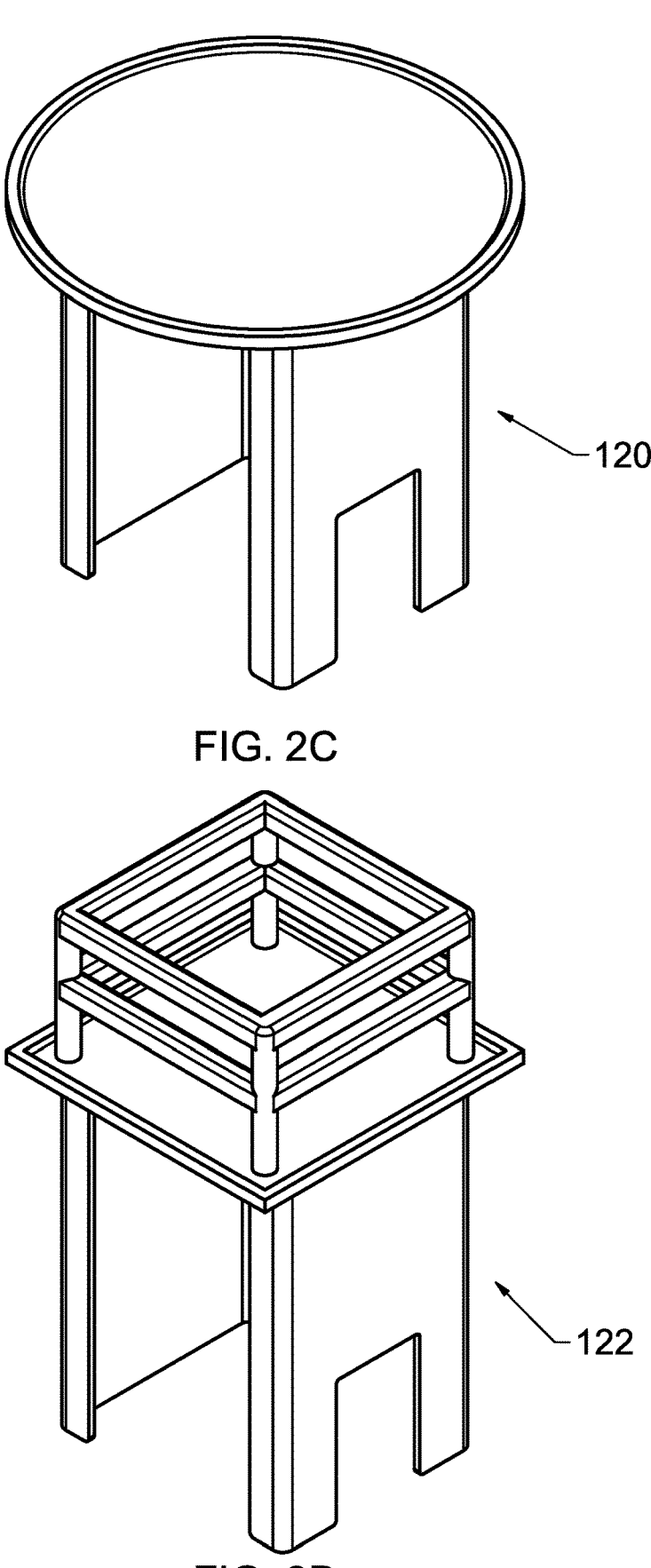
FIG. 2C is a perspective view of a slide-over table top attachment, in accordance with some embodiments of the present disclosure.
FIG. 2D is a perspective view of a slide-over holder attachment, in accordance with another embodiment of the present disclosure.

FIG. 2B is a front view of the holding apparatus 102 that shows the embedded display device 104, in accordance with another embodiment of the present disclosure. In this embodiment, the display device 104 may be an LCD screen and may have a size of about 10 inches.

FIG. 2D is a view of a removable slide-over holder attachment 122, in accordance with another embodiment of the present disclosure. The slide-over holder attachment is easily removed and provides additional holding space for objects, such as napkins, condiments, salt and pepper shakers and the like, in accordance with an embodiment of the present disclosure.

Figure 3A:
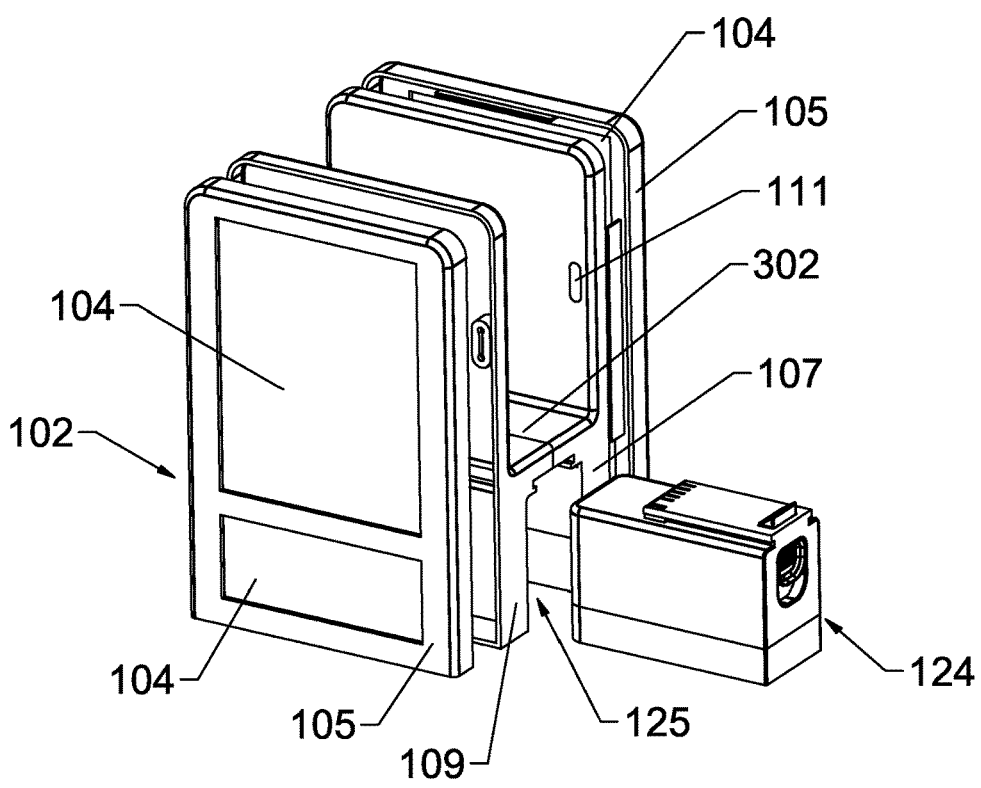
FIG. 3A is an exploded view of the holding apparatus, in accordance with an embodiment of the present disclosure.

The holding apparatus 102 as shown in FIGS. 3A and B comprises a bottom/middle section 302 configured to hold one or more objects, a plurality of holder sides, a right holder side 107 and a left holder side 109 disposed at each lower end of the bottom/middle section, and a battery housed within a battery compartment. In an embodiment, the holding apparatus may be utilized for holding a plurality of napkins and the holding apparatus may be placed at each table within a restaurant or at any public place.

The data store 106 comprises of a database server. The database server communicates with the application server 112, distributed file system, private block chain using one or more protocols such as, but not limited to, Open Database Connectivity (ODBC) protocol and Java Database Connectivity (JDBC) protocol, via the communication network 110. In an embodiment, the database server may refer to a computing device that may be configured to store advertiser metadata, advertisement metadata, DFS metadata, location metadata, block chain controller metadata, puck metadata, display device metadata, LCD metadata, lightning nodes and off chain transactions. In an embodiment, the data stored in the data store may be made accessible to the public internet via an API.

In an embodiment, the database server may include a special purpose operating system specifically configured to perform one or more database operations on the multimedia content. Examples of database operations may include, but are not limited to, Select, Insert, Update, and Delete. In an embodiment, the database server 102 may include hardware that may be configured to perform one or more predetermined operations. In an embodiment, the database server may be realized through various technologies such as, but not limited to, Microsoft® SQL Server, Oracle®, IBM DB2®, Microsoft Access®, PostgreSQL®, MySQL® and SQLite®, and the like.

The private block chain 108 may comprise of a distributed ledger, a plurality of controllers. The nodes in the private block chain 108 may comprise mining nodes, master nodes, authority nodes, archival full nodes, light nodes, and pruned full nodes.

The application server 112 may refer to a computing device or a software framework hosting an application or a software service. In an embodiment, the application server 112 may be implemented to execute procedures such as, but not limited to, programs, routines, or scripts stored in one or more memories for supporting the hosted application or the software service. In an embodiment, the hosted application or the software service may be configured to perform one or more predetermined operations. The application server 112 may be realized through various types of application servers such as, but are not limited to, a Java application server, a .NET framework application server, a Base4 application server, a PHP framework application server, or any other application server framework. In an embodiment, the application server 104 may be configured to build, manage and deploy dApps, Adunits, controllers, pucks and the display devices. In an embodiment, the application server 112 implements software applications that are used to build and deploy the distributed applications (dApps), AdUnits, Controllers, Pucks, and Display Devices The virtual mesh Wi-Fi network 114 connects to the private block chain using one of Wi-Fi, LAN, 4G, 5G or 6G or any other suitable communication protocols. The virtual mesh Wi-Fi network 114 comprises of the puck and the display devices. Each of the display devices located at a plurality of locations connect to the puck via a Wi-Fi network. A plurality of virtual mesh Wi-Fi networks 114 may be implemented within a geographic location. The private block chain, the distributed filed system, the application server, the virtual mesh Wi-Fi networks all together form the SD-WAN network.

The puck connected to the virtual mesh Wi-Fi network 114 connects to the private block chain using cryptographic keys to access the block chain network. In the example implementation, a puck is utilized to manage all display devices in a physical location. The puck is responsible for maintaining a connection to the public network (via WiFi, LAN, 4G/5C/Cellular/Satellite), along with wireless connections to each display device on its network. Every display device in the network contains one or more display surfaces (LCDs), a data processing unit, local data storage, a wireless communications device, and a unique static serial address. Each display device is able to share its wireless connection to the puck, creating a mesh wireless network.

The communication network 110 may correspond to a communication medium through which the each of the components/devices shown in FIG. 1 may communicate with each other. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G, 5G, 6G cellular communication protocols, and/or Bluetooth (BT) communication protocols.

In an embodiment, a method for displaying of advertisements using a private blockchain network is described. A physical display device advertising network, distributed across in a software-defined Wide Area Network (SD-WAN), utilizing a private Blockchain as the single cryptographically secure authoritative source for the operational data and procedural applications executing the real-time display of advertisements. Disclosed are examples of software systems, data models, devices, and methods required to implement this distributed advertising network upon a private Blockchain. In some implementations, the disclosed Ad Network incorporates: blockchain decentralized ledgers for large scale consensus on distributed data, tamper resistant storage, and scalable low cost microtransactions; large scale ML, AI, and deep-learning; and scalable compute infrastructure with graphics processing units (GPUs), tensor processing units (TPUs), and other specialized compute platforms.

In the example implementation, the controllers are utilized to provide the mining for a private blockchain that supports Smart Contracts (i.e. Ethereum, Solidify, with Truffle). A private Distributed File System (i.e. IPFS) is utilized to store all Ad media (image files) in a deterministic structure, indexed by a content-hash. The application server 112 implements software applications that are used to build and deploy the distributed applications (dApps), AdUnits, Controllers, Pucks, and Display Devices. Outside of the Software Defined Wide Area Network, the Ad Network Applications and a Datastore provide processes for the formation of Advertisers, Ads, Partners (Restaurants/Venues/Billboards), Locations, Ad Placements, and Accounting Systems—collectively "Ad Network Applications." The Ad Network Applications interface with the distributed Datastore that contains all meta data associated with the objects represented in the Blockchain Smart Contracts.

In the example implementation, a given Ad in an Ad Placement may have data associated with it (Advertisement Meta) that would include a URL that, when scanned in the form or a QR code overlay dynamically displayed with an Advertisement upon a Display Device, takes the local web browser to the URL on their mobile device. This meta data serves to support the functionality of the "Ad Network Applications," rather than the "Management Applications," which may inherit meta data from the Datastore via the transitions undertaken by the Ad Network Applications, but never directly from the Datastore itself.

Figure 3B:
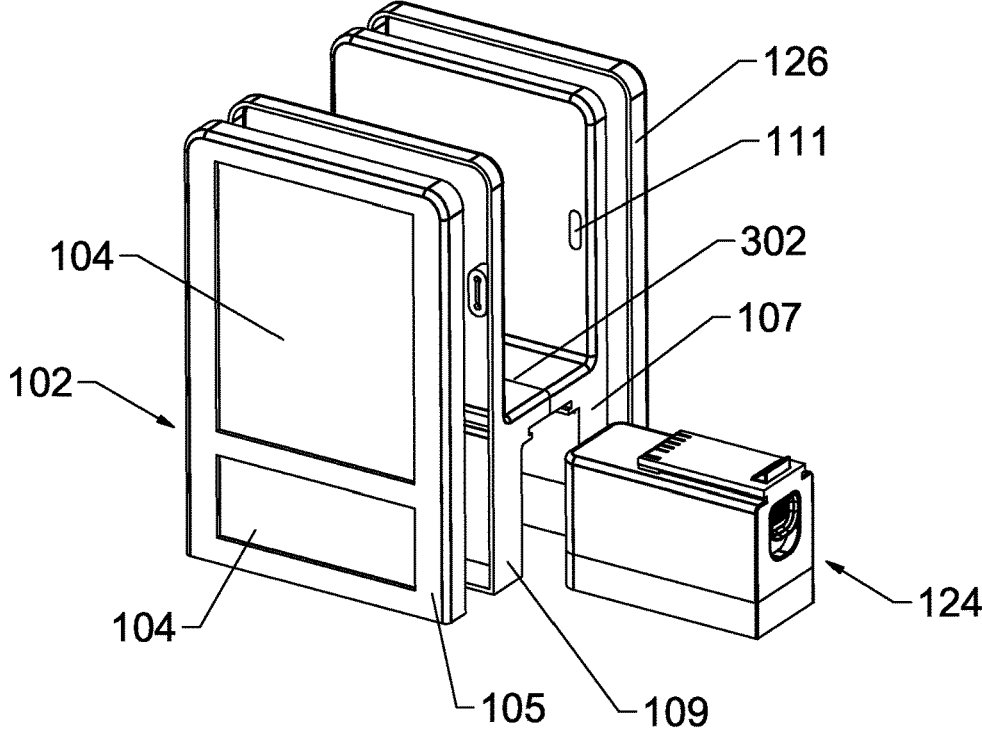
FIG. 3B is an exploded view of the holding apparatus, in accordance with another embodiment of the present disclosure.

FIG. 3A is an exploded view 300 of the holding apparatus, in accordance with some embodiments of the present disclosure. The holding apparatus 102 as shown in FIG. 3A comprises a screen holder 105 that frames display screen 104, a bottom/middle section 302 configured to hold one or more objects, such as napkins, cutlery and the like, the bottom/middle section 302 is comprised of right holder side 107 and left holder side 109 disposed at each lower end of the bottom/middle section, a battery 124 housed within a battery compartment 125 and a cover 111 that allows access to the interior of the device. The holding apparatus 102 as shown in FIG. 3B further comprises a back plate 126 to provide support to the right holder side 107. In the embodiment shown in FIG. 3B only one side of the device has the embedded display device 104, the side without the display device has the back plate 126. In an embodiment, the holding apparatus may be utilized for holding at least one of a plurality of napkins, cutlery and the like. In an embodiment, the holding apparatus may be placed at each table within a restaurant or at any public place.

Each of the above components of the holding apparatus 102 are made of plastic and the holding apparatus 102 further comprises an hdmi splitter, hdmi cables, a receiver and battery pack with wiring and charging embedded within the same. In an embodiment, the battery pack compartment slides in and out of the unit to easily replace the battery and put it into the charging station. Outside of the unit is a Rasberry Pi unit that is communicated to through the internet. Raspberry Pi is a low cost, credit-card sized computer that plugs into a computer monitor or TV. This unit casts the image to each receiver in a building.

The disclosed holding apparatus 102 gives restaurants an avenue to make monetary gains. The ability to display the advertising on each table using the display screen 104 of the holding apparatus 102 allows the restaurants and the manufacturer of the holding apparatus 102 to sell such display space for advertising purposes. In an embodiment, A percentage of the monetary gains received by the manufacturer will be given to the restaurant for the use of their table space and them changing out the batteries every after a pre-defined interval, such as after 24 hrs. This gives the restaurant to utilize the space in a way that they are getting use out of the area and not losing valuable table space. Further, restaurants have the ability to put napkins or menus into the display while using this area at the same time. In an embodiment, static ads changing every 30 seconds may be displayed on the display device 104. Further, the disclosed invention describes a method used to keep the advertisement images safe from being hacked and a new way of displaying these advertisement images safely.

In an embodiment, the value of the disclosed invention is very high, as the holding apparatus manufacturer is offering a percentage of the advertising revenue to the restaurants/businesses. This is something these hospitality companies need in tough pandemic type situations with the way the industries are being hurt. The holding apparatus 102 also has a very valued benefit to the advertiser as the advertisers are getting in front of consumers that are out with disposable incomes and usually are sitting there waiting to be served food and will see these advertisements throughout their visit. In an embodiment, variations of design for the holding apparatus 102 may be performed in the future to custom fit the tables as the restaurants desire. Thus, the holding apparatus 102 allows better ways to communicate with the consumers and hopefully help limit table space used moving forward. In an embodiment, the manufacturer of the holding apparatus 102 may not sell the units, but may prefer selling the advertising on the units. The advertisements will be 30 second static (Billboard Style) advertisements sold to the advertiser to be displayed on the screens.

In an embodiment, holding apparatus 102 will be given away for free to the restaurants. In an embodiment, the manufacturer may charge a minimal one-time fee for providing the holding apparatus 102 to the restaurants.

Figure 4:
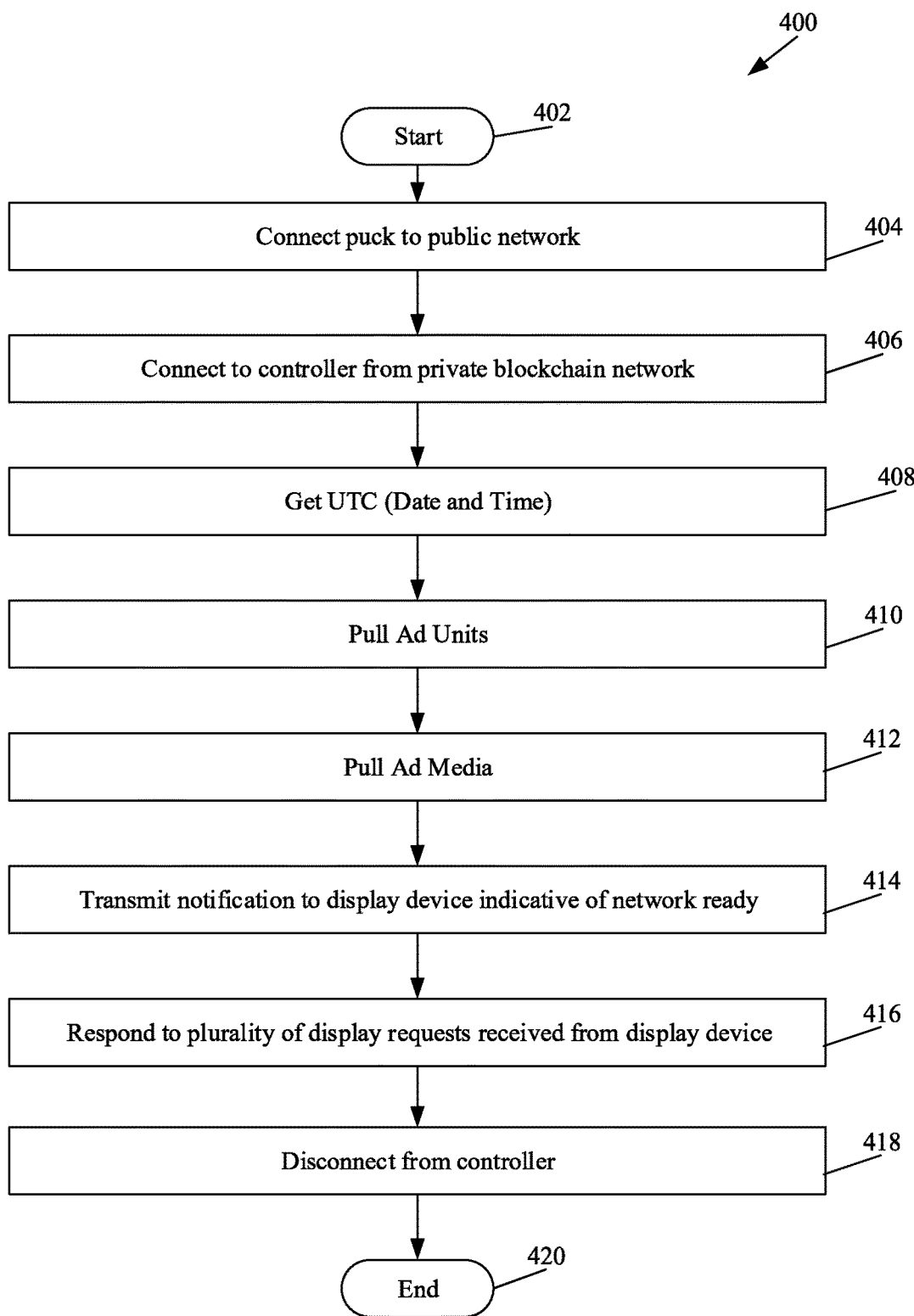
FIG. 4 is a flow diagram of an exemplary method executed by a puck for enabling secure display of advertisements on the display device embedded within the holding apparatus, in accordance with some embodiments of the present disclosure.

FIG. 4 is a flow diagram of an exemplary method 400 executed by a puck for enabling secure display of advertisements on the display device embedded within the holding apparatus, in accordance with some embodiments of the present disclosure. The display devices are programed to connect a Puck which is a router broadcasting on a hidden SSID. The Puck is also responsible for communicating with the servers. When a Puck is powered on, it runs through a set of processes to initialize itself as a member of the wider SD-WAN, upon which all other Pucks are members, along with the Private Block chain Network, a Distributed File System, and the servers supporting various Ad Network Management Applications. The method starts at step 402 start and proceeds to step 404.

At step 404, the puck is programed to connect to the public network. At step 406, the puck is configured to connect to a controller from the private block chain network. At step 408, the puck is configured to get the UTC i.e. date and time. At step 410, the puck is programed to pull or retrieve Adunits from the data store. At step 412, the puck is configured to pull or retrieve Ad media from the data store.

At step 414, the puck is programed to transmit a notification to each of the display devices. In an embodiment, the notification is indicative of the puck being network ready. At step 416, the puck is programed to respond to a plurality of display requests received from each of the display devices. At step 418, the puck is configured to disconnect from the controller. Control passes to end step 420.

Figure 5:
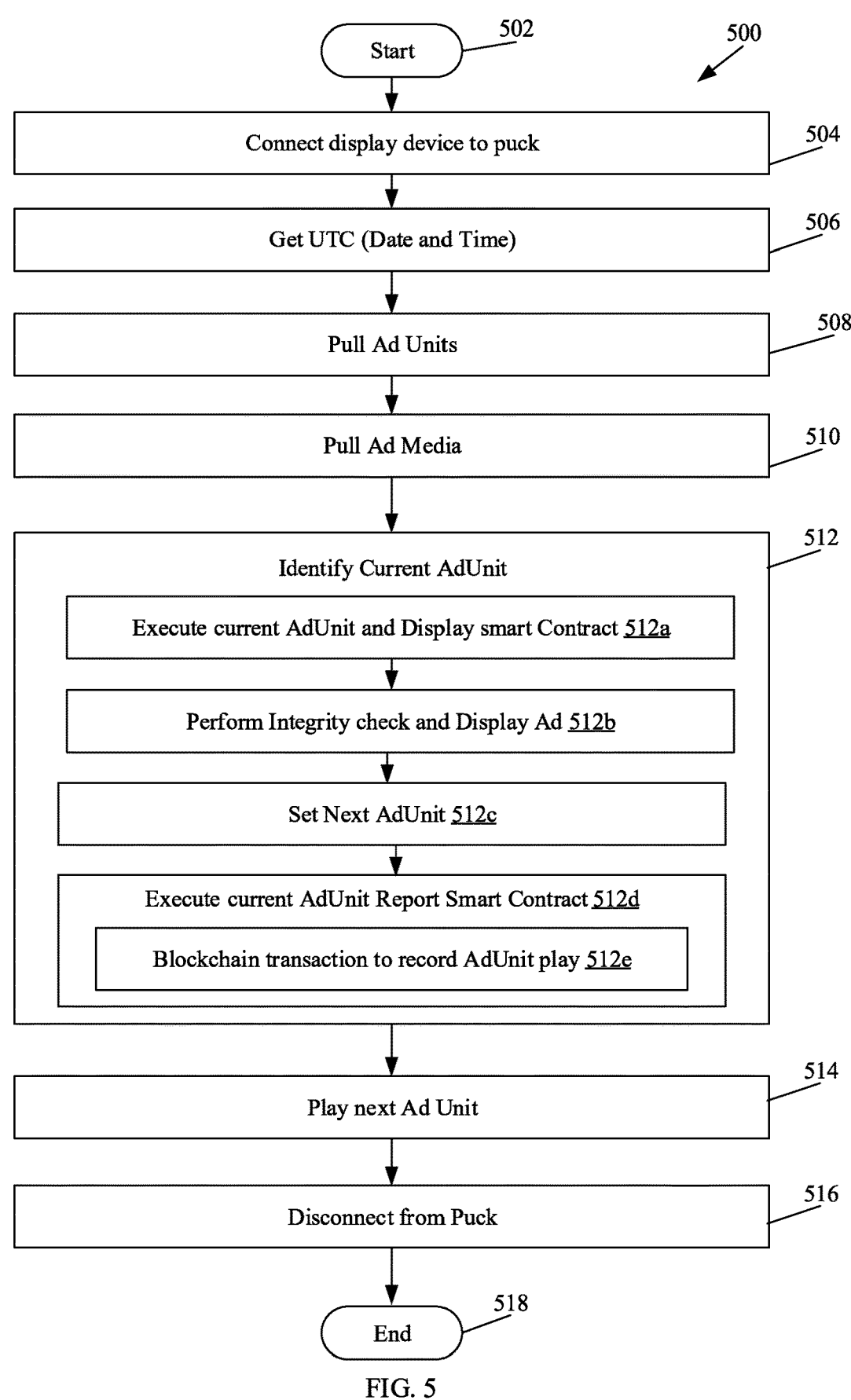
FIG. 5 is a flow diagram of an exemplary method executed by the display device for securely displaying advertisements on the display device embedded within the holding apparatus, in accordance with some embodiments of the present disclosure.

FIG. 5 is a flow diagram of an exemplary method 500 executed by the display device for securely displaying advertisements on the display device embedded within the holding apparatus, in accordance with some embodiments of the present disclosure. In an embodiment, a method for displaying of advertisements using a private block chain network is described.

The method starts at step 502 power on and proceeds to step 504. At step 504, the puck is configured to connect at least one display device to the puck. When the Display Device is powered on, it runs through a set of processes to initialize itself with the Puck ID assigned during deployment of the display device. At step 506, upon connecting to the puck, the display device synchronizes its internal clock to the UTC time provided by the puck.

At step 508, the puck is configured to pull or retrieve AdUnits from the data store via the puck. In an embodiment, the display device pulls the AdUnits for the next 24-hours from the Puck, who, in turn, will have received the AdUnits from the block chain network. At step 510, the puck is configured to pull or retrieve Ad media from the data store via the puck.

At step 512, the puck is configured to identify a current adunit that needs to be displayed on the display device 104. Once the current AdUnit is identified, then at step 512*a* the puck is configured to execute current AdUnit and display the smart contract. Further, at step 512*b* the puck is configured to perform integrity check of the smart contract and then display the advertisement. Further, at step 512*c* the puck is configured to set next AdUnit for display in the next time interval. Next, at step 512*d* the puck is configured to execute current AdUnit report smart contract and at step 512*e* the puck is configured to execute a block chain transaction to record the AdUnit play. When the smart contract for the AdUnit is executed, it executes the AdUnit Reporting Smart Contract, which writes the successful execution of the AdUnit to the Block chain Network. Thus, using the AdUnit report the advertiser will understand whether the requested advertisements were displayed as per the smart contract or not.

In an embodiment, the display device identifies the current AdUnit and executes its display smart contract, performs integrity checks the AdPlacement ID, displays the advertisement on the LCD of the display device, and then sets the Next AdUnit for the display device, repeating this process until all of the AdUnits in the queue have been displayed or the display device is powered off.

In an embodiment, every AdUnit represents an opportunity to display an advertisement. Each AdUnit may be represented as a dot-hexadecimal notation, which consists of four octets of the address expressed individually in hexadecimal numbers and separated by periods. Querying the blockchain network for an AdUnits address will return the address of the Ad placement smart contract associated with the AdUnit. The unique addressing schema also provides for rapid segmentation by Puck, Device, LCD Display, as well as a snapshot of all Ads displaying on the network at any given point-in-time, along with their ownership. Below is a representation of the AdUnit addressing when the Ad Placement Contract has been fulfilled (executed). Below is a sample representation of the Ad Placement Smart Contract.

AdUnit ID: 063C.00A1.0002.61E4F8E2
Ad Placement Smart Contract Address[bytes32]

```solidity
pragma solidity 0.8.7;
contract AdPlacement {
    // Declare state variables of the contract
    address public owner;
    mapping (address => bytes32) public adUnit;
    mapping (address => bytes32) public adID;
    bool public executed; // if true, the AdPlacement has executed
    uint public cost; // cost of the AdPlacement
    // When 'AdPlacement' contract is deployed:
    // 1. set the deploying address as the owner of the contract
    // 2. set the deployed smart contract's adUnit to 0
    // 3. set the deployed smart contract's adID to 0
    constructor(bytes32 adUnitID, bytes32 adID) {
        owner = msg.sender;
        adUnit[address(this)] = adUnitID; // the adUnit ID
        adID[address(this)] = adID; // the ad ID default
        executed[address(this)] = false; // the ad ID default
    }
    // Allow the owner to set the smart contract's adUnit
    function setAdUnit(uint adunitaddress) public {
        require(msg.sender == owner, "Only the owner can set the AdUnit ID.");
        adUnit[address(this)] += address;
    }
    // Allow the owner to set the smart contract's adID
    function setAdID(uint adid) public {
        require(msg.sender == owner, "Only the owner can set the adID.");
        adID[address(this)] += adid;
    }
    // Allow the owner to set the smart contract's execution status
    function adsExecuted( ) public {
        require(msg.sender == owner, "Only the owner can set execution status.");
        executed[address(this)] = true;
    }
    // Allow anyone to purchase placement
    function purchase(uint amount) public payable {
        require(msg.value >= amount * cost dollar, "You must pay the cost of the AdPlacement");
        require(cost[address(this)] >= amount, "Not enough funds to complete this purchase");
        cost[address(this)] -= amount;
```

AdUnit Addressing

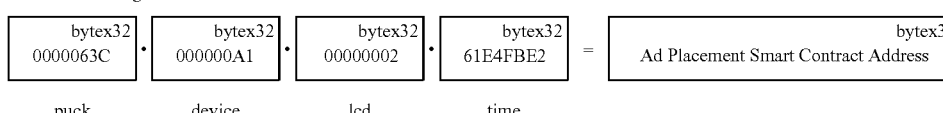

| bytex32 | | bytex32 | | bytex32 | | bytex32 | | bytex32 |
|---|---|---|---|---|---|---|---|---|
| 0000063C | • | 000000A1 | • | 00000002 | • | 61E4FBE2 | = | Ad Placement Smart Contract Address |
| puck | | device | | lcd | | time | | |

AdUnit ID as a string: 063C.00A1.0002.61E4F8E2
Each AdUnit Address (ID) maps to a Smart Contract Address representing an Ad Placement
puck = 32 byte ID of a puck (hexadecimal)
device = 32 byte ID of a display device (hexadecimal)
lcd = 32 byte ID of a LCD (hexadecimal)
time = seconds since 1/1/1970 (UNIX Epoch) in UTC GMT 0 in hexadecimal In an embodiment, the Ad Placement Smart Contracts provide a facility with both data and procedural instructions to allow a given Ad Placement to be executed upon the display device, tracking ownership of the Placement, along with the value of the Placement when it was executed (Ad displayed upon LCD). When an AdUnit is created, an associated Smart Contract is instantiated in the Block chain. The Ad Placement Smart Contract will be initially owned by the Ad Network itself so as to be purchasable by an Advertiser for a set value, transferable to the Ad Network -continued AdUnit ID: 063C.00A1.0002.61E4F8E2
Ad Placement Smart Contract Address[bytes32]

```solidity
        cost[msg.sender] += amount;
    }
}
```

At step 514, the puck is configured to play or display the next AdUnit. Upon executing all of the AdUnits, the display device pulls the AdUnits for the next 24-hours from the Puck. At step 516, the puck is configured to disconnect from the puck. Control passes to end step 518.

Various embodiments of the invention provide a method and holding apparatus for securely displaying advertisements on the display device embedded within the holding apparatus. The disclosed embodiments encompass numerous advantages. The disclosure leads to secure displaying of advertisement on a display device that is embedded in a holding apparatus which may be utilized for holding napkins or one or more objects. The claimed invention prevents man in the middle attack against advertisement display networks. As the system is blockchain based hence there is complete transparency, immutability, security, privacy, and disintermediation. Further, the disclosed invention enables the advertisers for Point-in-Time Auditability of Ad Network Activity.

The steps as discussed above are not routine, conventional, or well understood in the art, as the claimed steps enable the following solutions to the existing problems in conventional technologies.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The specification has described a system, a method and a holding apparatus. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A holding apparatus for displaying advertisements, the holding apparatus comprising:
   a bottom/middle section for holding one or more objects;
   a plurality of holder sides disposed at each lower end of the bottom/middle section;
   a top/middle section;
   a battery housed within a battery compartment; and
   a screen back plate to providing support to a display device embedded within each of the plurality of holder sides, wherein the display device securely displays one or more advertisements for a pre-defined time interval, using a private blockchain network, the private blockchain network providing a cryptographically secure and authoritative source for operational data and procedural applications that execute a real-time display of the one or more advertisements with deterministic playback verification,
   wherein the deterministic playback verification comprises:
      (a) performing, prior to displaying an advertisement, an integrity check of a smart contract associated with the advertisement retrieved from the private blockchain network; and
      (b) executing, subsequent to displaying the advertisement, a blockchain transaction to immutably record the playback of the advertisement on the private blockchain network.

2. The holding apparatus as claimed in claim 1, wherein the battery compartment is a removable battery compartment.

3. The holding apparatus as claimed in claim 1, wherein the display device caches one or more advertisements and associated cryptographic verification data from the private blockchain network, enabling the secure and deterministic display of the one or more advertisements during a period of disconnection from an external network.

4. The holding apparatus as claimed in claim 1, wherein the operational data includes a unique AdUnit identifier for each advertisement playback event, the AdUnit identifier comprising a dot-hexadecimal notation that maps the playback event to a specific smart contract on the private blockchain network.

5. A method for securely displaying advertisements on a display device embedded within a holding apparatus, the method comprising:
   utilizing a private blockchain network as a cryptographically secure and authoritative source for operational data and procedural applications for executing a real-time display of one or more advertisements;
   performing, prior to displaying a first advertisement of the one or more advertisements, an integrity check of a smart contract associated with the first advertisement, the smart contract being retrieved from the private blockchain network;

displaying the first advertisement on the display device subsequent to a successful integrity check; and executing, subsequent to displaying the first advertisement, a blockchain transaction to immutably record the playback of the first advertisement on the private blockchain network.

6. The method of claim 5, further comprising:

caching, on the holding apparatus, a schedule of advertisements and associated smart contracts for a predefined time interval;

wherein the steps of performing the integrity check and displaying the first advertisement are executed autonomously by the display device during a period of disconnection from an external network.

7. The method of claim 5, wherein the step of performing the integrity check of the smart contract is preceded by a step of identifying the smart contract using a unique AdUnit identifier, the AdUnit identifier comprising a dot-hexadecimal notation that maps the playback event to a specific address of the smart contract on the private blockchain network.

* * * * *